United States Patent [19]

Nakajima et al.

[11] Patent Number: 4,764,099
[45] Date of Patent: Aug. 16, 1988

[54] COMPRESSOR HAVING DISCHARGE VALVE MEANS ADAPTED TO ENHANCE THE COEFFICIENT OF PERFORMANCE OF THE COMPRESSOR

[75] Inventors: Nobuyuki Nakajima; Kenichi Inomata; Shigeru Okada, all of Konan, Japan

[73] Assignee: Diesel Kiki Co., Ltd., Shibuya, Japan

[21] Appl. No.: 62,441

[22] Filed: Jun. 11, 1987

[30] Foreign Application Priority Data

Jun. 18, 1986 [JP] Japan .................. 61-141849

[51] Int. Cl.$^4$ .............. F04C 2/344; F16K 15/14; B23P 15/00
[52] U.S. Cl. .................. 418/270; 137/512.15; 137/853; 29/156.7 A
[58] Field of Search .................. 418/266–270; 29/156.7 A X, 557; 137/512.15, 533.11, 539, 853, 855, 856

[56] References Cited

U.S. PATENT DOCUMENTS

| | | | |
|---|---|---|---|
| 1,759,798 | 5/1930 | Murphy | 137/539 |
| 1,999,599 | 4/1935 | Smith | 29/156.7 A |
| 2,174,337 | 9/1939 | Welsmiller | 29/156.7 A |
| 4,070,895 | 1/1978 | Yamada | 29/156.7 A |
| 4,127,369 | 11/1978 | Eiermann | 418/270 |
| 4,149,834 | 4/1979 | Eiermann | 137/512.15 |
| 4,199,309 | 4/1980 | Connor | 418/270 |
| 4,305,424 | 12/1981 | Wankel | 137/512.15 |
| 4,570,585 | 2/1986 | Hayashi | 29/156.7 A |
| 4,668,172 | 5/1987 | Shibuya | 418/270 |

FOREIGN PATENT DOCUMENTS

| | | | |
|---|---|---|---|
| 72965 | 6/1980 | Japan | 137/855 |
| 41493 | 3/1982 | Japan | 418/270 |
| 126194 | 8/1984 | Japan | . |

*Primary Examiner*—William L. Freeh
*Attorney, Agent, or Firm*—Frishauf, Holtz, Goodman & Woodward

[57] ABSTRACT

A cylinder has at least one valve seating surface-forming portion which has an outer surface formed therein with at least one recess, the bottom surface of which serves as a valve seating surface. A discharge valve is arranged on the outer surface of the valve seating surface-forming portion to close or open outlet holes formed in respective ones of the valve seating surface at locations where the wall thickness of the cylinder is the minimum. The discharge valve has at least one elastic valve body having an arcuate cross section and disposed in tight contact with a corresponding one of the valve seating surface. The valve seating surface is arcuately concavely cured with almost the same radius of curvature as that of the valve body of the discharge valve.

8 Claims, 8 Drawing Sheets

COMPRESSOR HAVING DISCHARGE VALVE MEANS ADAPTED TO ENHANCE THE COEFFICIENT OF PERFORMANCE OF THE COMPRESSOR

BACKGROUND OF THE INVENTION

This invention relates to a compressor which has discharge valve means adapted to enhance the coefficient of performance of the compressor.

In a compressor in general, which compresses fluid, a cylinder accommodating a piston or a rotor has an outer surface formed thereon with at least one flat valve seating surface at a predetermined location and also formed therein with outlet holes communicating with a pump working chamber defined between an inner surface of the cylinder and the piston or the rotor, and a discharge valve is arranged over the valve seating surface to close and open the outlet holes. The minimum possible thickness of the outer wall of the cylinder should be more than a value corresponding to required yield strength of the compressor. Accordingly, also a portion of the cylinder wall formed with the above valve seating surface has to have a sufficient thickness at least equal to the minimum possible thickness. However, if the above portion of the cylinder wall has such a sufficient thickness, the internal spaces of the outlet holes have a considerably large overall volume, as is the case with a conventional compressor. This large internal volume of the outlet holes forms a great part of the dead volume of the compression space of the compressor, i.e. a great part of the clearance volume of the pump working chamber formed at the termination of the compression stroke, resulting in degraded coefficient of performance of the compressor.

This is also the case with a conventional vane compressor which has a cylinder having an endless camming inner peripheral surface, and a rotor rotatably received within the cylinder and carrying vanes slidably fitted therein, wherein pump working chambers are defined between the endless camming inner peripheral surface, the outer peripheral surface of the rotor, and adjacent ones of the vanes. That is, the aforementioned problem of degraded coefficient of performance is caused by a series of outlet holes with a large internal volume, formed through the peripheral wall of the cylinder and communicating with a pump working chamber on the compression stroke. To be specific, when tip of a preceding vane passes the outlet holes opening in the camming inner peripheral surface of the cylinder, residual compressed gas in the internal spaces of the outlet holes leaks into a pump working chamber on the compression stroke defined by the succeeding vane. Consequently, in the pump working chamber on the compression stroke, the internal pressure increases, resulting in an increase in the power required for the compression and accordingly increased energy loss of the compressor. Also, the leaked compressed gas is again compressed, causing an increase in the temperature of the discharge gas.

To improve the compression efficiency of the compressor, it is therefore required to reduce the internal volumes of the outlet holes which form a great part of the dead volume of the compressor.

To meet the above requirement, there has been proposed a discharge valve for refrigerant compressors, as shown in FIG. 1, by U.S. Ser. No. 783,834 filed Oct. 3, 1985 (now U.S. Pat. No. 4,668,172, issued May 26, 1987) assigned to the assignee of the present application, which is a continuation-in-part application of abandoned U.S. application No. 575,889 filed Feb. 1, 1984 (by Japanese Utility Model Registration Application No. 61-019651 filed Feb. 14, 1986 in Japan), which comprises a plurality of arcuately concavely curved grooves 14 circumferentially formed in an outer peripheral surface of the cam ring 2a of the cylinder 2 at locations where outlet holes 10 are radially formed through the cam ring 2a so as to minimize the wall thickness of the above locations, a plurality of annular valve bodies 11 formed by an elastic sheet and received in the respective grooves 14 for urging contact with bottom surfaces 14a of the respective grooves 14 for opening and closing the respective outlet holes 11, a holder member 12 mounted on the outer peripheral surface of the cam ring 2a and supporting the valve bodies 11, and a plurality of stoppers 13 secured to the holder member 12 and located within the respective valve bodies 11 for preventing excessive deformation of the valve bodies 11 away from the outlet holes 10.

With such construction of the discharge valve, the outlet holes 10 can be greatly reduced in length by forming the arcuate grooves 14 in the outer peripheral surface of the cam ring 2a at locations where the outlet holes 10 are radially formed therethrough, so as to minimize the wall thickness of the above locations, thus minimizing the dead volume formed by the outlet holes 10.

However, according to the discharge valve as constructed as above, in forming the grooves 14 by means of a cutter such as a milling cutter, the entire bottom surfaces 14a of the grooves 14 have to be smoothly finished although just small areas of the bottom surfaces 14a are in contact with the valve body 11. In addition, ribs 14b are formed between the adjacent grooves 14 so as to reinforce the strength of the peripheral wall of the cam ring 2a, but they interfere with the rotary shaft of the milling cutter inserted into the grooves 14, which makes it impossible to use a small-sized milling cutter capable of forming grooves with the same radius of curvature as that of the valve bodies 11.

However, the use of a large-sized milling cutter which does not interfere with the ribs 14b makes it impossible to machine the bottom surfaces 14a of the grooves 14 to such a small radius of curvature as is equal to that of the valve bodies 11. Consequently, the radius R of curvature of the bottom surfaces 14a is too large, as compared with the radius r of curvature of the valve bodies 11, to ensure tight contact of the valve bodies with the seating surface portions of the bottom surface 14a.

If the valve bodies 11 are arranged to be strongly forced against the seating surface portions in order to obtain tight contact therebetween, the valve bodies cannot be opened by a suitable pressure force of the compressed gas, resulting in excessive compression of the gas and degraded performance of the compressor.

SUMMARY OF THE INVENTION

It is the object of the invention to provide a compressor having discharge valve means in which the valve bodies are positively kept in tight contact with the seating surfaces in an airtight manner without forcibly depressing the valve bodies against the seating surfaces of the discharge valve.

According to the invention, there is provided a compressor including a cylinder having an inner surface and an outer peripheral surface, the inner surface including a circcumferentially curved inner peripheral surface serving as a camming surface;

fluid pressurizing means movably arranged within the cylinder, the fluid pressurizing means cooperating with the inner surface of the cylinder to define at least one pump working chamber which performs at least one of suction of compression fluid and compression of same;

at least one valve seating surface-forming portion forming part of the cylinder and having an outer surface;

at least one recess formed in the outer surface of the at least one valve seating surface-forming portion, the at least one recess having a bottom surface serving as at least one valve seating surface;

at least one outlet hole formed in the at least one valve seating surface-forming portion, the at least one outlet hole having one end opening in a corresponding one of the at least one valve seating surface and another end opening in the inner surface of the cylinder and facing a corresponding one of the at least one pump working chamber on a compression stroke;

at least one discharge valve arranged on the outer surface of the at least one valve seating surface-forming portion for closing and opening the at least one outlet hole, the at least one discharge valve being formed of an elastic sheet material having an arcuate cross section, the at least one discharge valve having at least one valve body having an outer peripheral surface disposed at least in part in direct contact with a corresponding one of the at least one valve seating surface and a pair of supporting portions each formed integrally with the at least one valve body at a side remote from a corresponding one of the at least one valve seating surface and extending axially;

stopper means for preventing excessive movement of the at least one valve body of the at least one discharge valve, the stopper means having stopper portions corresponding in number to the number of the at least one valve body of the discharge valve, the stopper portions each being arranged within a corresponding one of the at least one valve body in spaced relation thereto, and a connecting portion formed integrally with the stopper portions at a side remote from the at least one valve seating surface and extending axially; and holder means mounting the discharge valve on the outer surface of the at least one valve seating surface-forming portion, the holder means having an engaging portion facing toward the at least one valve seating surface, the supporting portions of the at least one discharge valve engaging with the engaging portion, the connecting portion of the stopper means being joined to the engaging portion.

The compressor according to the invention is characterized by an improvement wherein the at least one valve seating surface comprises an arcuately concavely curved surface having a radius of curvature substantially equal to a radius of curvature of a corresponding one of the at least one valve body.

Preferably, the at least one valve seating surface is formed by pressing with a press or by grinding with a grinding tool.

The above and other objects, features and advantages of the invention will be more apparent from the ensuing detailed description taken in conjunction with the accompanying drawings.

DETAILED DESCRIPTION

Figure 1:
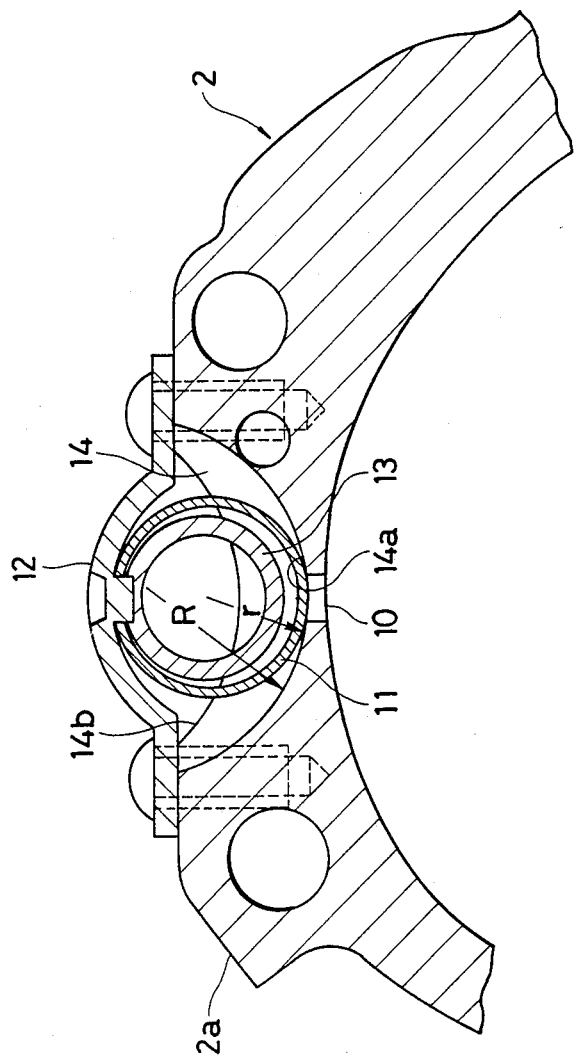
FIG. 1 is a fragmentary transverse cross-sectional view of a conventional compressor.

The invention will now be described in detail with reference to FIGS. 2 through 9 of the accompanying drawings, showing an embodiment thereof.

In the figures, reference numeral 1 designates a cylindrical casing accommodating therewithin a cylinder 2 which is formed by a cam ring 2a having an inner peripheral camming surface elliptical in cross section, and a front side block 2b and a rear side block 2c closing open opposite end faces of the cam ring 2a, respectively. A rotor 4 is rotatably received within the cylinder 2 for rotation in unison with a rotary shaft 3 disposed within the cylinder 2, about an axis thereof. The rotor 4 has a plurality of vane slits 5 radially formed therein in circumferentially equidistantly spaced relation to each other in which are slidably fitted vanes 6, respectively.

With such arrangement, as the rotor 4 is rotated through the rotary shaft 3 by a prime mover or the like, the vanes 6 are brought into sliding contact with the inner peripheral camming surface of the cylinder 2 by the action of vane back pressure acting on the respective vanes 6 at their inner end faces as well as a centrifugal force caused by the rotation of the rotor 4 so that the vanes 6 are radially slidably moved within the respective vane slits 5 depending upon the camming surface of the cam ring 2a. The respective vanes 6 serve to divide a pair of space chambers A and B within the cylinder 2, which are diametrically separated from each other by the rotor 4, into a plurality of pump working chambers 7.

A pair of inlet holes 8 are formed in the front side block 2b to communicate pump working chambers 7 on the suction stroke with a suction chamber 40, while a pair of outlet holes 10 are formed in the peripheral wall of the cam ring 2a to communicate pump working chambers 7 on the delivery stroke with a discharge pressure chamber 9.

Discharge valves 11 are provided on the outer peripheral surface of the cam ring 2a so as to open and close the respective discharge holes 10.

Figure 2:
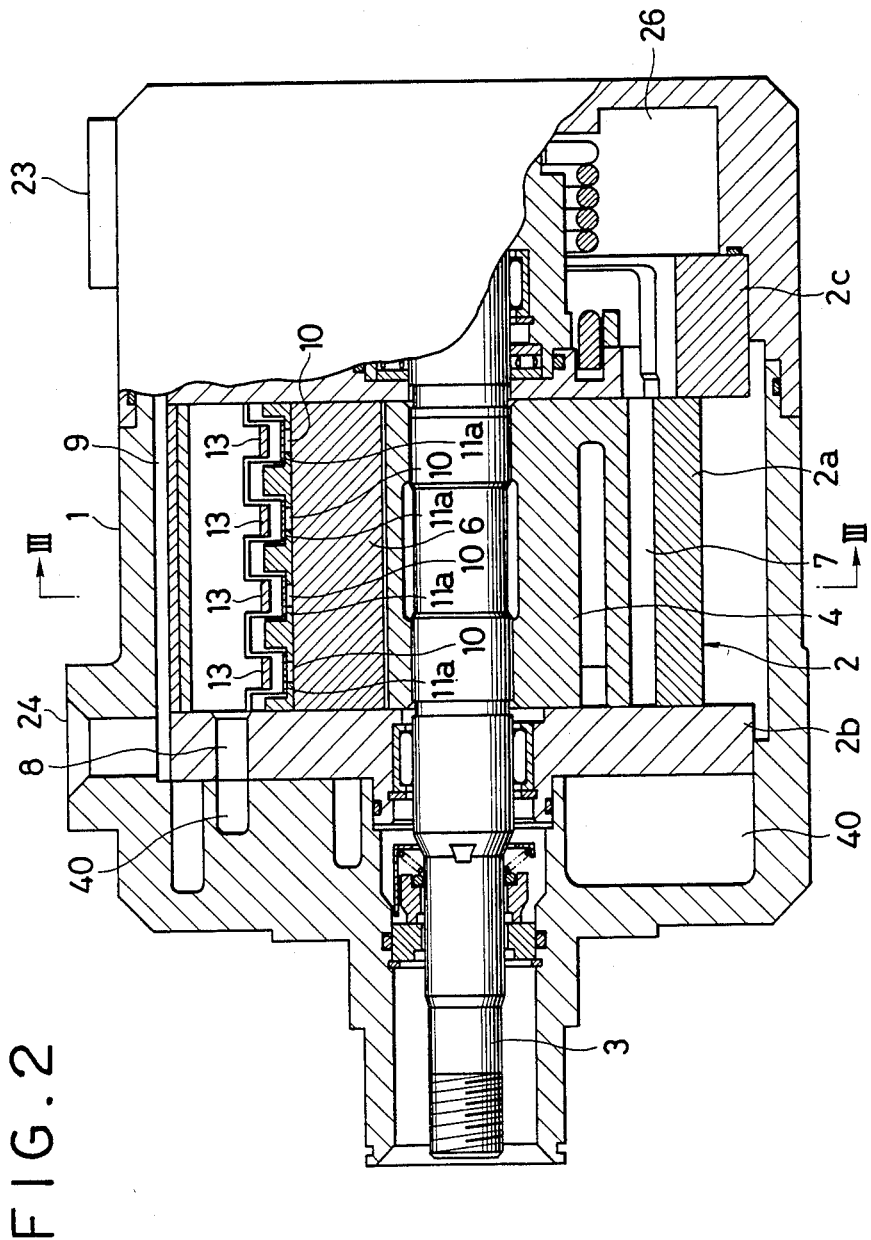
FIG. 2 is a longitudinal cross-sectional view of a vane compressor according to one embodiment of the invention.
Figure 3:
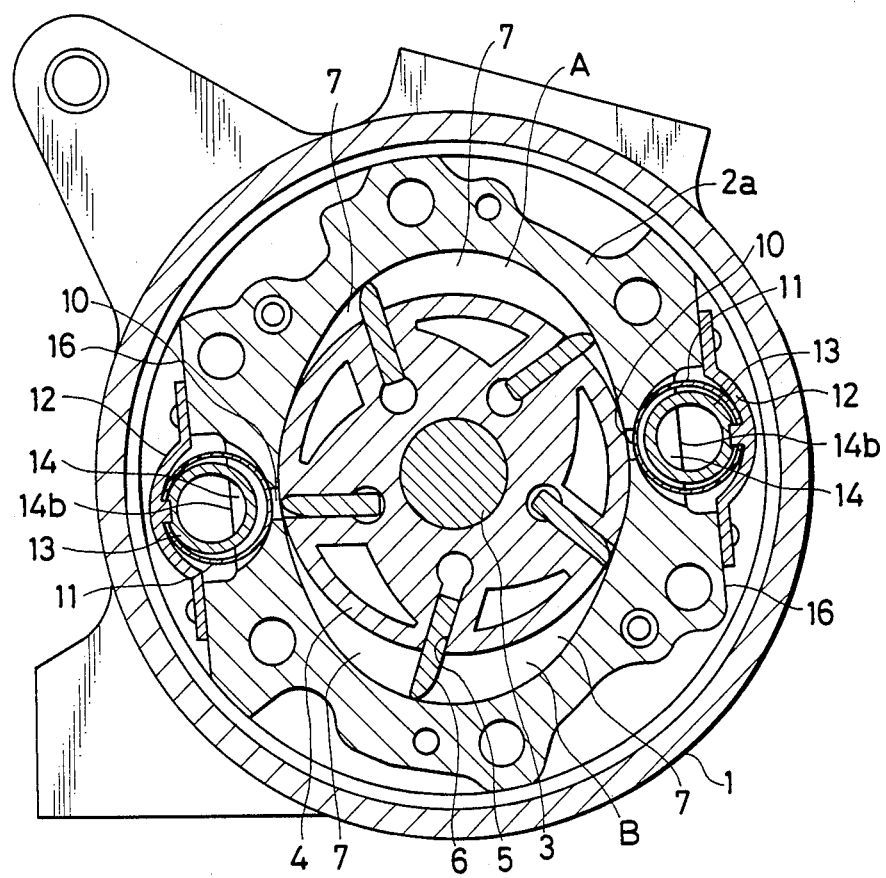
FIG. 3 is a transverse cross-sectional view taken along line III—III in FIG. 2.

In FIG. 2, reference numerals 23 and 24 designate, respectively, a suction port and a discharge port formed in the casing 1, the former communicating via a check valve, not shown, with the suction chamber 40, and the latter with the discharge pressure chamber 9, respectively.

With such construction of the compressor, when the rotor 4 is rotated in unison with the rotary shaft 3, the vanes 6 are circumferentially moved with their tips in sliding contact with the inner peripheral camming surface of the cam ring 2a to cause the pump working chambers 7 defined by the adjacent vanes 6 to change in volume, thus effecting suction, compression, and discharge of the refrigerant gas in the mentioned order.

During the suction stroke of the compressor, the volume of the pump working chamber 7 increases to cause refrigerant gas to be drawn through the inlet hole 8 into the pump working chamber 7, during the compression stroke the volume of the pump working chamber 7 decreases to cause the refrigerant gas within the chamber 7 to be compressed, and during the discharge stroke immediately after completion of the compression stroke the refrigerant gas thus compressed forces the discharge valves 11 to open to be discharged through the outlet holes 10 into the discharge pressure chamber 9.

In the illustrated embodiment, the outlet holes 10 are four in number and radially formed through the cam ring 2a in axially equidistant relation to each other, at each of valve seating surface-forming portions 16 of the outer peripheral surface of the cam ring 2a at diametrically opposite locations.

The valve seating surface-forming portions 16 each have a flat surface which is formed therein with four grooves 14 which are juxtaposed axially of the cylinder 2 and each circumferentially extend parallel to each other, an arcuate, i.e. arcuately concavely curved bottom surface 14a. The outlet holes 10 each open at one end in a deepest portion of the bottom surface 14a of a corresponding one of the grooves 14, and open at the other end in the camming inner peripheral surface of the cylinder 2. The other end of each outlet hole 10 faces a corresponding one of pump working chambers 7 on the compression stroke.

The outlet holes 10 are each formed in the deepest portion of the bottom surface 14a of the groove 14, i.e., at such a location that the wall thickness of the peripheral wall of the cylinder 2 is the minimum, thereby reducing the substantially length of the outlet hole 10 and hence the dead volume of the internal space thereof.

Figure 5:
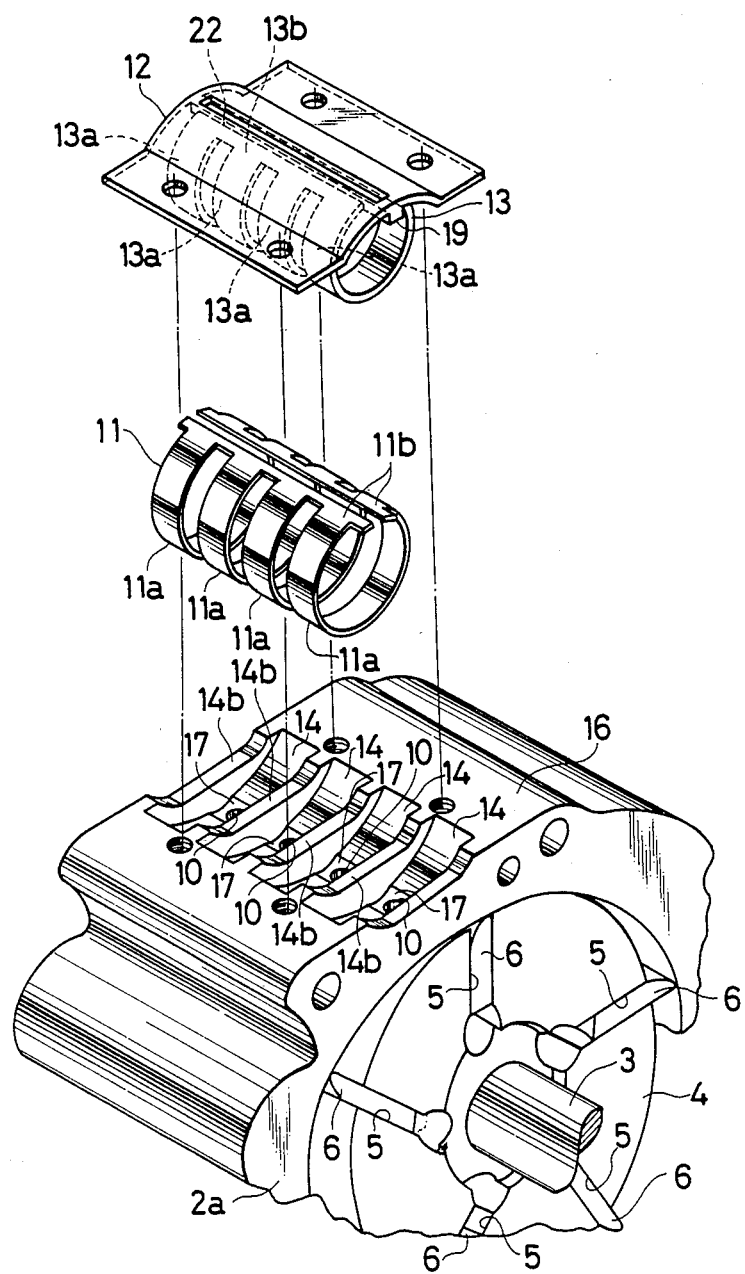
FIG. 5 is an exploded perspective view illustrating the discharge valve.
Figure 6:
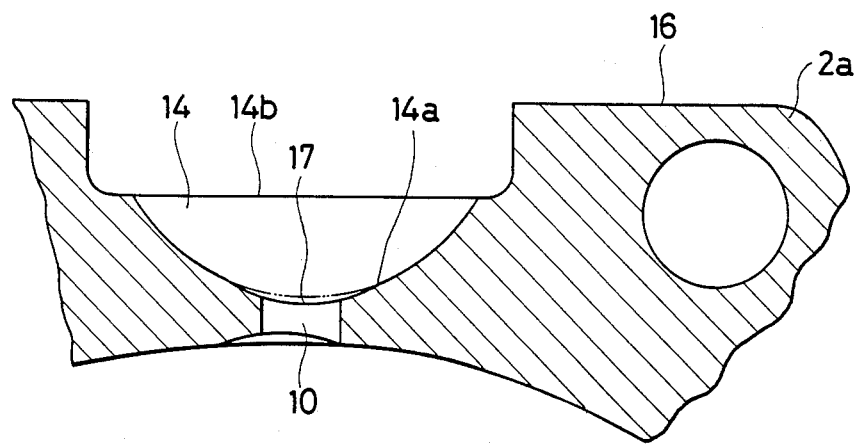
FIG. 6 is a fragmentary cross-sectional view illustrating a valve seating surface portion of a groove in the cam ring.

Ribs 14b are formed integrally with the valve seating surface-forming portion 16 in a manner separating adjacent ones of the four grooves 14 from each other. Each rib 14b has its outer side surface formed with an arcuate recess, as best shown in FIG. 5, for facilitating machining of the cylinder 2 for formation of the grooves 14. Alternatively, a rectangular recess may be formed in the outer side surface of each rib 14b.

The grooves 14 are formed by milling with a milling cutter or by casting. They each have a seating surface 17 formed at a circumferentially central portion (the deepest portion) of the bottom surface 14a thereof. The seating surface 17 is in the form of an arcuately concavely curved with a substantial circumferential length having a radius R1 of curvature equal to the radius r of curvature of the valve body 11a. The radius of curvature of the portions of the bottom surface 14a other than the seating surface 17 is larger than R1. Consequently, the portions of the bottom surface 14a other than the seating surface 17 are not brought into contact with the valve body 11a even when the valve body 11a is seated on the seating surface 17.

The seating surfaces 17 are formed by pressing by the use of a press in a manner as described below.

Figure 7:
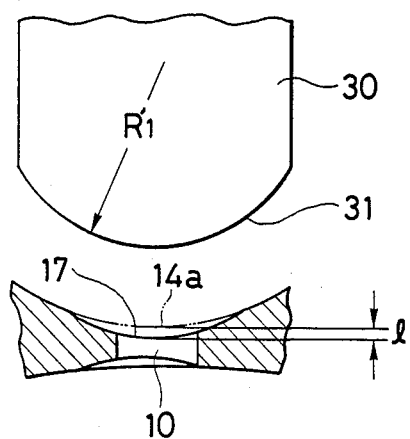
FIG. 7 is a view useful for explaining a manner of forming a seating surface at a groove bottom surface of the cam ring by means of pressing with a press.
Figure 8:
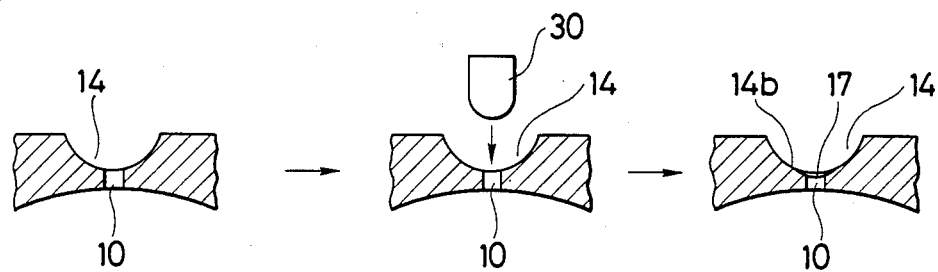
FIG. 8 is a view useful for explaining a procedure of forming the seating surface by means of pressing.

As shown in FIG. 7, a punch 30 of the press has an arcuate tip surface having a radius R'1 of curvature almost equal to the radius r of curvature of the valve body 11a, i.e., R'1=R1. The punch 30 has its surface 31 located at the circumferentially central portion of the bottom surface 14a of the groove 14, and then load or pressure is applied to the punch 30 so as to form the arcuately concavely curved seating surface 17 at the circumferentially central portion, as shown in FIGS. 7 and 8. The amount or length l of pressing is preferably 0.2–0.5 mm.

By thus forming the seating surfaces 17 by means of pressing, the seating surfaces 17 can have a radius of curvature almost equal to that of the valve body 11a, as well as a smooth finished surface.

Figure 9:
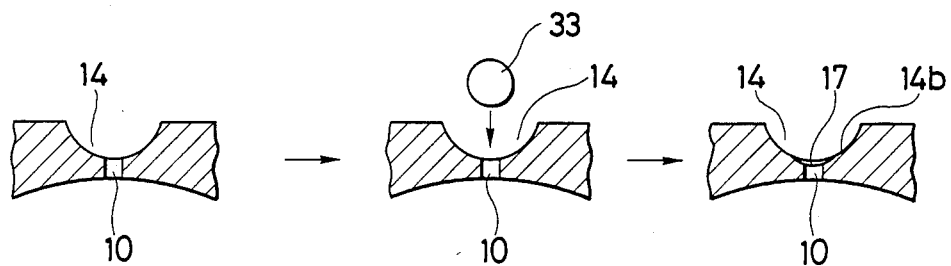
FIG. 9 is a view similar to FIG. 8, illustrating a procedure of forming a seating surface by means of grinding with a grinding tool.

Alternatively of pressing, the seating surfaces 17 may be formed by grinding, as shown in FIG. 9. In the case where the radius R of curvature of the bottom surface 14a is approximately 25 to 30 mm and the grinding tool in the form of a rod has a radius r1 of approximately 18 mm, the amount of grinding is preferably 0.2 to 0.3 mm. According to this alternative method, the load or pressure to be applied to the grinding tool 33 can be small and the shank diameter of the tool can also be small. Therefore, the ribs 14b can have a larger width, thus providing increased strength to the cylinder 2.

The discharge valve 11 is formed of an elastic metallic sheet member, which is curved so as to have a C-shaped cross section, as shown in FIG. 5.

The discharge valve 11 comprises four valve bodies 11 each having a C-shaped cross section, which are juxtaposed to each other at predetermined intervals, and a pair of supporting portions 11b formed integrally with the valve bodies 11a at opposite side edges thereof, i.e. at a side of the valve bodies 11a remote from the bottom surfaces 14a of the grooves 14, and axially extending to connect the valve bodies 11a with each other. The valve bodies 11a of the discharge valve 11 are each laid over the valve seating surface 17 of the arcuate bottom surface 14a of its corresponding one of the grooves 14, in tight contact therewith.

The discharge valve 11 is supportedly engaged with a holder member 12 in such a manner that the paired supporting portions 11b are disposed in urging contact or engagement with opposite lateral side surfaces of a ridge 19 secured on a circumferentially central portion of an inner peripheral surface of the holder member 12. The holder member 12 is formed of a metal plate which has an arcuately curved intermediate portion. The holder member 12 has two lateral edge portions thereof firmly fixed to the valve seating surface-forming portion 16 of the outer peripheral surface of the cam ring 2a by means of bolts 20.

Figure 4:
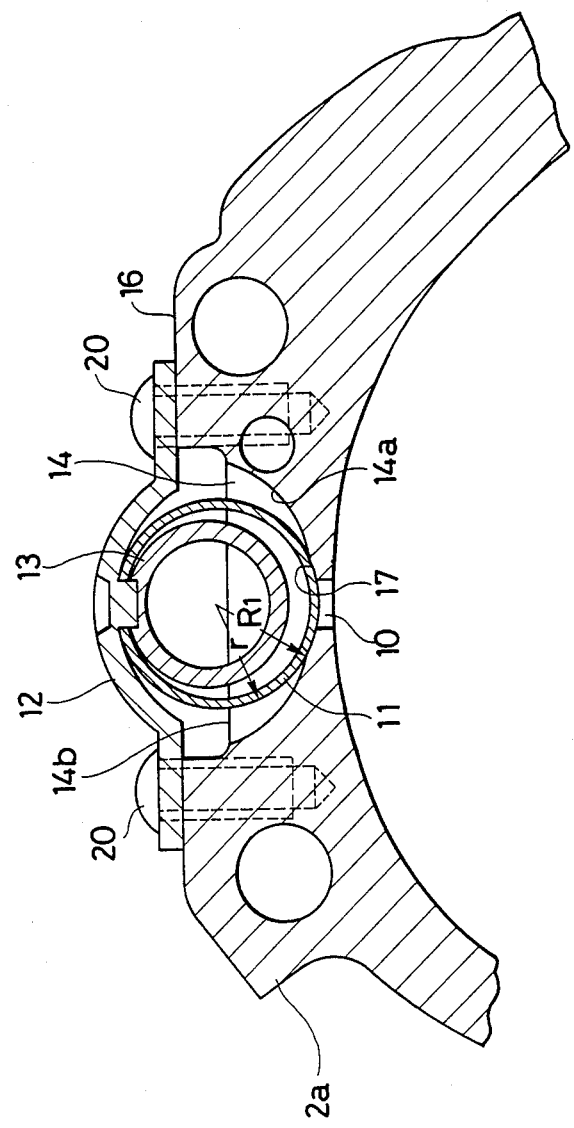
FIG. 4 is a fragmentary cross-sectional view illustrating a discharge valve of the compressor.

The valve bodies 11a are mounted on the cam ring 2a by means of the holder member 12 is such a manner that the valve bodies 11a are normally urged in the valve-closing direction by its own elasticity, as shown in FIG. 4, with part of their outer peripheral surfaces disposed in tight contact with the seating surfaces 17 of the respective grooves 14 to keep the respective outlet holes 10 closed in an airtight manner.

A stopper 13 is arranged within the valve bodies 11a with a certain gap given between the stopper 13 and the valve bodies 11a for restricting excessive deformation of the valve bodies 11a in the valve-opening direction, i.e., toward the holder member 12.

The stopper 13 is formed of a metal plate having high rigidity and comprises, as shown in FIG. 5, a generally cylindrical member which is formed with four stopper portions 13a circumferentially extending parallel with each other at predetermined intervals, and also with a connecting portion 13b integral with the stopper portions 13a at a side thereof remote from the valve seating surfaces 17 and axially extending to connect the stopper portions 13a with each other. The stopper 13 is supported by the holder member 12 with the connecting portion 13b secured, e.q. by brazing to the ridge 19 of the holder member 12.

Figure 10:
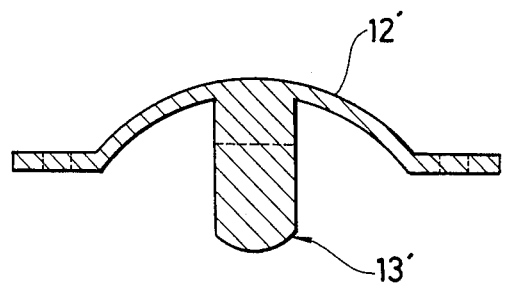
FIG. 10 is a transverse cross-sectional view of a variation of a stopper and a holder member of the discharge valve, wherein the two members are formed integrally with each other.
Figure 11:
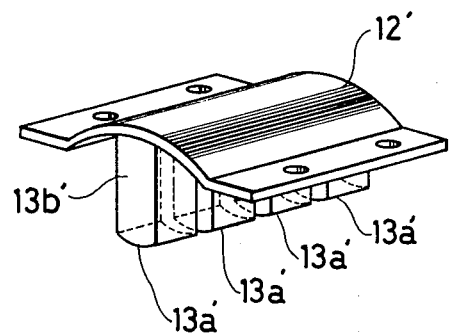
FIG. 11 is a perspective view of the variation of FIG. 10.

As shown in FIGS. 10 and 11, the stopper 13' may be formed integrally with a holder member 12'. To be specific, the holder member 12' is formed integrally or in one body with four stopper portions 13a' circumferentially extending parallel with each other at predetermined intervals, and also with a connecting portion 13b' integral with the stopper portions 13a' at a side thereof remote from the valve seating surfaces 17 and axially extending to connect the stopper portions 13a' with each other.

The operation of the compressor having the discharge valves 11 constructed as above will be described below. During operation of the compressor, the pressure of compressed refrigerant gas in the pump working chamber 7 on the delivery stroke acts upon the valve bodies 11a of the discharge valve 11 through the outlet holes 10 to thereby forcibly deform same so as to make part of their outer peripheral surfaces detached from the seating surfaces 17 of the grooves 14, whereby the compresed gas is discharged through the opened outlet holes 10 into the discharge pressure chamber 19. Any excessive displacement of the valve bodies 11a during opening of the valve is prevented by the stopper 13.

When the discharge of the compressed gas is terminated, the valve bodies 11a of the discharge valve 11 return to the position shown in FIG. 4 by their own elasticity or force of restitution. In such valve closing state, the valve bodies 11a are positively kept in tight contact with the seating surfaces 17 in an airtight manner since the radius of curvature of the latter is almost equal to that of the former.

According to the invention, it suffices that only the seating surfaces 17 of the grooves 14 with which the valve bodies 11a are to be brought into contact are smoothly finished simply by pressing or grinding while the other portions of the bottom surfaces 14a than the seating surfaces 17 need not be smoothly finished but can be roughly finished, thus making it unnecessary to smoothly finish the entire bottom surfaces of the grooves as in the discharge valve of the prior application, referred to hereinbefore, thereby facilitating the machining operation.

What is claimed is:

1. In a compressor including:

a cylinder having an inner surface and an outer peripheral surface, the inner surface including a circumferentially curved inner peripheral surface serving as a camming surface;

fluid pressurizing means movably arranged within said cylinder, said fluid pressurizing means cooperating with said inner surface of said cylinder to define at least one pump working chamber which performs at least one of suction of compression fluid and compression of same;

at least one valve seating surface-forming portion forming part of said cylinder and having an outer surface;

at least one recess formed in said outer surface of said at least one valve seating surface-forming portion, said at least one recess having a bottom surface serving as at least one valve seating surface;

at least one outlet hole formed in said at least one valve seating surface-forming portion, said at least one outlet hole having one end opening in a corresponding one of said at least one valve seating surface and another end opening in said inner surface of said cylinder and facing a corresponding one of said at least one pump working chamber on a compression stroke;

at least one discharge valve arranged on said outer surface of said at least one valve seating surface-forming portion for closing and opening said at least one outlet hole, said at least one discharge valve being formed of an elastic sheet material having an arcuate cross section, said at least one discharge valve having at least one valve body having an outer peripheral surface disposed at least in part in direct contact with a corresponding one of said at least one valve seating surface and a pair of supporting portions each formed integrally with said at least one valve body at a side remote from a corresponding one of said at least one valve seating surface and extending axially;

stopper means for preventing excessive movement of said at least one valve body of said at least one discharge valve, said stopper means having stopper portions corresponding in number to the number of said at least one valve body of said discharge valve, said stopper portions each being arranged within a corresponding one of said at least one valve body in spaced relation thereto, and a connecting portion formed integrally with said stopper portions at a side remote from said at least one valve seating surface and extending axially; and holder means mounting said discharge valve on said outer surface of said at least one valve seating surface-forming portion, said holder means having an engaging portion facing toward said at least one valve seating surface, said supporting portions of said at least one discharge valve engaging with said engaging portion, said connecting portion of said stopper means being joined to said engaging portion;

the improvement wherein said at least one valve seating surface comprises: a first arcuately concavely curved surface having said one end of the at least one outlet hole formed therein and extending for a substantial circumferential length on both sides thereof with a radius of curvature, r, equal to a radius of curvature of a corresponding one of said at least one valve body, and second and third arcuately concavely curved surfaces extending, respectively, on opposite sides of and away from said outlet hole beyond ends of said first arcuately concavely curved surface remote from said outlet hole, said second and third arcuately concavely curved surfaces having a radius of curvature greater than r; and wherein the length of said at least one valve seating surface is longer than a diameter of said at least one valve body.

2. A compressor as claimed in claim 1, wherein said stopper means is formed integrally with said holder means.

3. A compressor as claimed in claim 1, wherein said fluid pressurizing means comprises a rotor rotatably received within said cylinder, said rotor having an outer peripheral surface formed therein with a plurality of axial slits, a plurality of vanes radially slidably fitted, respectively, in said axial slits and disposed for sliding contact with said inner peripheral surface of said cylinder, adjacent ones of said vanes cooperating with said inner surface of said cylinder and said outer peripheral surface of said rotor to define therebetween said at least one pump working chamber.

4. A compressor as claimed in claim 1, wherein said at least one recess comprises a plurality of grooves formed in said outer surface of said at least one valve seating surface-forming portion in a manner facing radially outwardly and circumferentially extending parallel with each other, said grooves each having a bottom surface as one of said at least one valve seating surface, and at least one rib interposed between adjacent ones of said grooves, said at least one rib extending along the whole lengths of said adjacent ones of said grooves and completely separating said adjacent ones of said grooves from each other.

5. A compressor as claimed in claim 4, wherein said at least one valve body of said at least one discharge valve comprises a plurality of valve bodies corresponding in number to the number of said grooves and extending parallel to each other at predetermined intervals each at least larger than the width of said at least one rib of said at least one recess, said valve bodies being connected with each other by said pair of supporting portions of said at least one discharge valve.

6. A compressor as claimed in claim 1, wherein said stopper portions of said stopper means extend parallel to each other at predetermined intervals each at least larger than the width of said at least one rib of said at least one recess, and are connected with each other by said connecting portion of said stopper means.

7. A compressor as claimed in claim 6, wherein said stopper means is formed integrally with said holder means.

8. A compressor as claimed in claims 1 or 6, wherein said stopper means is formed in a discrete member from said holder means, said connecting portion of said stopper means being secured to said engaging portion of said holder means.

* * * * *